UNITED STATES PATENT OFFICE.

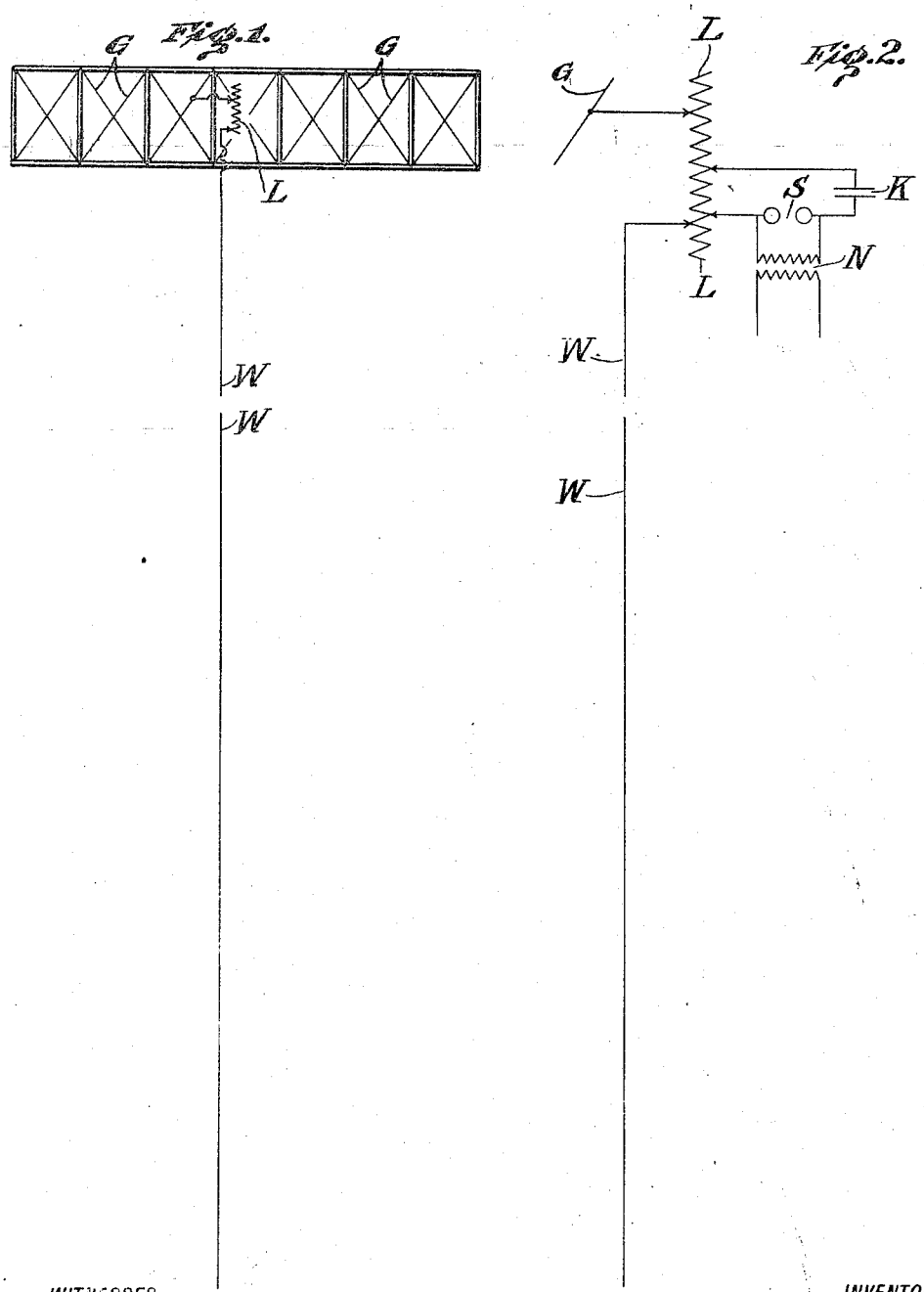

HARRY M. HORTON, OF NEW YORK, N. Y.

SYSTEM OF AEROPLANE-SIGNALING.

1,165,412.

Specification of Letters Patent. Patented Dec. 28, 1915.

Application filed October 15, 1910. Serial No. 587,209.

*To all whom it may concern:*

Be it known that I, HARRY M. HORTON, a citizen of the United States of America, and a resident of New York city, New York, have invented certain new and useful Improvements in Systems of Aeroplane-Signaling, the principles of which are set forth in the following specification and accompanying drawing, which disclose the form of the invention which I now consider to be the best of the various forms in which the principles of the invention may be embodied.

This invention relates to an aeroplane signaling system.

The object, which already has been accomplished by me, is such a system of wireless signaling (telegraphy or telephony) employing etheric electric waves, as can be practically employed in combination with an aeroplane, such for example, as any of the aeroplanes now in use, bi-planes or monoplanes; that is to say, a system all the apparatus of which is combined with and carried by the aeroplane itself, such that an operator on the plane can at any part of the flight, send or receive intelligence to or from distant points, such as other aeroplanes, or vessels or land stations.

The disclosed system, which already has operated successfully as a system of aeroplane signaling over distances of several miles, resulted only after many failures of endeavors of myself and others to apply to aeroplane work the ordinary principles as known to those skilled in wireless telegraphy.

Thus far the disclosed system has been operated only on a one-man plane, wherein the aviator served also as the telegraph operator; and in that case I placed the telegraph key under the operator's finger on the steering wheel. But I contemplate that in the future practice of my invention, the aeroplane will carry two persons, one the aviator and the other the signalman; because it is obviously impracticable to obtain the best results from one man, particularly when it is desired to have the signalman communicate information to a headquarters, as to his observations of the country over which the plane is being aviated. Hence the invention is not concerned with any details of arrangement such as the most convenient locations of apparatus on the plane. The practice will naturally develop, of having a signalman whose sole duty shall be, (with eyes on the country below, telephone on head, and hand on key, or mouth to transmitter), to send and receive intelligence to and from distant stations.

My invention relates particularly to those modifications of the ordinary wireless systems which my successful work has shown to be those which should be made in order to permit practical aeroplane signaling.

Of the drawings, Figure 1 is an elevation of an aeroplane, shown by way of example as a bi-plane, and Fig. 2 is a diagrammatic illustration of the signaling circuits and apparatus carried by the plane, showing the manner of combining the aeroplane with the apparatus and circuits.

The machine of Fig. 1 possesses, as an important element of its structure, the metallic wire guys or stays G. These are employed as stays or braces in various ways now well known to skilled aviators. For some time, during my unsuccessful experiments, in attempting to apply wireless signaling to aeroplane work, those stays seemed to be the means of defeating every attempt at practical working. Finally, however, as hereinafter described, I turned them to a positive and very important advantage.

The apparatus shown in Fig. 2, exclusive of the parts G and W, and consisting of a combination with the inductance coil L, of a local signaling circuit and apparatus, is placed on the aeroplane (Fig. 1) in any convenient manner. No particular way is shown because that is immaterial to the invention, and because the location may be selected by any ordinary skilled person. This "local" apparatus may be of any desired nature and may be either an outfit for sending or receiving; or both may be used, with suitable switches known in the wireless art, for permitting alternate use of either sending or receiving means with the main signaling circuit. By way of example, (Fig. 2) a sending outfit is shown, consisting of a local closed oscillating circuit including a condenser K, a spark-gap S, and more or less (adjustable, as indicated by arrow-heads) of the inductance L. Energy may be supplied to the local circuit by any suitable means, but for aeroplane work the generating apparatus should of course be of small mass, and I have found, particularly with the important features of my invention to be described, that it is sufficient to employ an ordinary induction coil N provided as usual with an automatic break, in combination with a key and battery in series. In my successful work I have used three two-volt storage cells in series in the primary of the coil. The secondary of the coil N may be advantageously connected around the spark-gap S, as shown.

Although it is possible, by using the important features of the invention to be described, to dispense with inductance-loading of the main signaling circuit, yet I prefer to place the coil L in that circuit in order to prolong the oscillations therein. It is immaterial, however, how the local signaling or oscillating circuit is arranged relative to the main circuit for coöperation therewith, although, as shown, I prefer to make the two circuits coöperative by way of the coil L, as being a simple and efficient arrangement.

In my experience most of my difficulties arose in connection with the main signaling circuit; and no way of working, either with or without the coil L, was productive of good results, until the teachings of past experience with wireless were discarded. The trouble seemed to be due chiefly to the deleterious effect on the main signaling circuit, of the metallic stays and the driving apparatus on the plane, no matter what kind of a main circuit was used. The stays seemed to affect both sides of the main circuit, i. e., both connections of that circuit from the coil L or from the local-circuit connection. But finally, success was instantaneously accomplished by the execution of the seemingly simple expedient of dispensing with any usual or customary connection on one side of the main circuit, and by substituting therefor the stays themselves; and also in simply entirely removing from the plane the main circuit connection on the other side, and throwing it over-board,— simply retaining its upper end in electrical connection with the stays G and local circuit apparatus, preferably by way of the coil L. Thus the resulting combination was: the connection of the upper part of coil L to the stays G, and a connection from the lower part of the coil to a pendant wire W.

The above conception and execution by me followed my observation that the stays were not insulated from each other, so that they might all together constitute, as it seemed to me, a very long conductor having considerable capacity or condensance such that said conductor might not only be well adapted for use as one side of the main circuit, but by being usefully employed in the main circuit, its evil effects might be obviated on a main circuit constituted otherwise. In short, a trial, by way of experiment, demonstrated that to be the case. The freely pendant wire W is shown as broken away in order to indicate the fact that it is preferably of considerable length, i. e., best of the order of hundreds of feet when the plane is at high elevations, although the lower end of the wire need not approach nearer the earth than hundreds of feet. The wire W apparently need not be in all cases so long as several hundred feet, as I have found in practice that good results may be had when it is only fifty or seventy-five feet long. Of course any suitable means may be employed for quickly reeling the wire on or off the plane during aviation, but the invention is not concerned with such minor matters. The aeroplane used in the case referred to had such structure as is well known to those skilled in the art, and so far as this invention is concerned it is material only that the stays constitute a considerable electrical capacity or condensance. As a matter of fact, in the case referred to, all the wire stays G on the aeroplane, fore and aft and on the sides, were connected together, and, by means of additional metallic stays or wires, were connected to the driving apparatus itself. The diagonal stays G shown, were each screwed into metallic clamps which held together the wooden top and bottom plane-frames, and the wooden uprights; and at each point where two diagonal stays G crossed each other, a wire was wrapped around the junction and soldered thereto; so that all those metallic diagonal stays were electrically connected together.

By disposing the wire W, as above, away from the stays G, particularly when the latter are used as the other side of the main circuit, I find that all deleterious action of the stays on the main circuit is obviated and, in fact, those stays are most usefully employed in the main circuit; and, by using the stays G as the main circuit, I avoid all necessity for wire-supporting structures extending up from the aeroplane structure, and at the same time provide a highly efficient system for either sending or receiving. Thus, any suitable known receiving outfit can be substituted for the sending outfit shown in Fig. 2, and associated in the same or any suitable way with the main signaling circuit to be in coöperative relation therewith. That needs no further description, as the thing involves fundamentally no more than connecting a detector in place of the spark-gap S and in substituting for the coil N a receiving device such as a telephone; except that it may be desirable to provide a special receiving circuit in which inductance L and condenser K may have different values from those used for sending all as well known.

For both sending and receiving, it may be desirable at times, as in war, to employ tuning; and to that end it is also preferable to employ the coil L; and it is possible to vary the amount of L in the main circuit to vary the tune; and also, when the local circuit apparatus is such as to permit tuning, it is possible to tune the local circuit to the main circuit by varying the amount of L in the local circuit; the latter also may be varied to vary the transformation of potential or the degree of coupling.

An important advantage of the particular system disclosed, irrespective of its broadest aspects, is the freedom of any means, such as outstanding wire-supports for the main circuit, which would interfere with the normal construction or operation of the aeroplane. The combination of the inductance L with the other parts G, W of the main circuit, permits ample capacity being given that circuit with minimum length of the freely pendant wire W, whereby any inconveniences attendant upon the manipulation of that wire, as by reels, are greatly reduced. Various other advantages will be apparent to those having occasion to use the invention.

I claim:

1. In a system of aeroplane signaling, the combination with the frame of the aeroplane, of a concentrated electrical inductance supported thereon, a conducting wire depending from the aeroplane frame and electrically connected to one part of said inductance; a second conducting wire of substantial length and electrically connected to another part of said inductance and disposed substantially about the periphery of said aeroplane frame, and signaling apparatus operatively connected with the radio signaling circuit constituted by said inductance and two conducting wires.

2. In a system of aeroplane signaling, the combination with the frame of an aeroplane, of radio signaling apparatus supported by said frame, a conducting wire depending from said frame and electrically connected to said signaling apparatus, and a second conducting wire of substantial length and electrically connected to said signaling apparatus and depending wire to constitute a radio signaling circuit, said second wire being disposed substantially about the periphery of said aeroplane frame.

HARRY M. HORTON.

Witnesses:
PHILIP FARNSWORTH,
WM. F. FORBES, Jr.